US009218469B2

(12) United States Patent
Hoppe et al.

(10) Patent No.: US 9,218,469 B2
(45) Date of Patent: Dec. 22, 2015

(54) SYSTEM AND METHOD FOR INSTALLING AUTHENTICATION CREDENTIALS ON A NETWORK DEVICE

(75) Inventors: Sally Blue Hoppe, Corvallis, OR (US); Jim Harritt, Albany, OR (US); Matt Torres, Corvallis, OR (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 2196 days.

(21) Appl. No.: 12/205,685

(22) Filed: Sep. 5, 2008

(65) Prior Publication Data

US 2009/0271850 A1 Oct. 29, 2009

Related U.S. Application Data (60) Provisional application No. 61/047,985, filed on Apr. 25, 2008.

(51) Int. Cl.
G06F 17/30 (2006.01)
G06F 21/31 (2013.01)
H04L 29/06 (2006.01)

(52) U.S. Cl.
CPC .............. *G06F 21/31* (2013.01); *H04L 63/06* (2013.01)

(58) Field of Classification Search
CPC ....................................... H04L 63/06
USPC .................................... 726/5, 6, 12
See application file for complete search history.

(56) References Cited

U.S. PATENT DOCUMENTS

| 5,754,763 | A | 5/1998 | Bereiter |
| 6,012,088 | A | 1/2000 | Li et al. |
| 6,532,543 | B1 | 3/2003 | Smith et al. |
| 6,606,663 | B1 * | 8/2003 | Liao et al. ............... 709/229 |
| 6,732,105 | B1 * | 5/2004 | Watson et al. |
| 6,918,038 | B1 | 7/2005 | Smith et al. |
| 7,010,690 | B1 | 3/2006 | Hanna et al. |
| 7,143,287 | B2 | 11/2006 | Bade et al. |
| 7,171,555 | B1 * | 1/2007 | Salowey et al. ............ 713/156 |
| 7,184,999 | B1 * | 2/2007 | Watson et al. ............ 707/770 |
| 7,428,754 | B2 * | 9/2008 | Neumann et al. ............ 726/15 |
| 7,698,384 | B2 * | 4/2010 | Drouet et al. ............ 709/219 |
| 7,848,312 | B2 * | 12/2010 | Zhang et al. ............ 370/352 |
| 7,882,538 | B1 * | 2/2011 | Palmer .................. 726/1 |
| 7,979,912 | B1 * | 7/2011 | Roka .................... 726/28 |
| 2002/0144144 | A1 * | 10/2002 | Weiss et al. ............ 713/201 |
| 2003/0058827 | A1 | 3/2003 | Chow et al. |
| 2003/0216144 | A1 * | 11/2003 | Roese et al. ............ 455/456.1 |
| 2004/0107360 | A1 | 6/2004 | Herrmann et al. |
| 2004/0107366 | A1 | 6/2004 | Balfanz et al. |
| 2004/0172559 | A1 | 9/2004 | Luo et al. |
| 2004/0268140 | A1 | 12/2004 | Zimmer et al. |
| 2005/0055578 | A1 | 3/2005 | Wright et al. |

(Continued)

*Primary Examiner* — Tamara T Kyle
(74) *Attorney, Agent, or Firm* — Hewlett Packard Enterprise Patent Department (57) ABSTRACT

A method for installing authentication credentials on a network device. An intermediary computing device (e.g., client computer) downloads an application for installing the authentication credentials from a secure website. The application on the intermediary computing device requests authentication credentials from a Network Access Control (NAC) credential service. The application passes the authentication credentials received from the NAC credential service through the intermediary computing device to an endpoint (e.g., video conferencing device). The application installs the authentication credentials on the endpoint.

20 Claims, 3 Drawing Sheets

(56) References Cited

U.S. PATENT DOCUMENTS

| | | |
|---|---|---|
| 2005/0278775 A1 | 12/2005 | Ross |
| 2006/0101409 A1 | 5/2006 | Bemmel |
| 2006/0112431 A1 | 5/2006 | Finn et al. |
| 2006/0161967 A1 | 7/2006 | Dawson et al. |
| 2006/0164199 A1 | 7/2006 | Gilde et al. |
| 2006/0168648 A1 | 7/2006 | Vank et al. |
| 2006/0234730 A1* | 10/2006 | Bibr et al. .................... 455/466 |
| 2006/0268856 A1* | 11/2006 | Voit et al. ...................... 370/389 |
| 2007/0050839 A1 | 3/2007 | Dharanikota et al. |
| 2007/0098178 A1 | 5/2007 | Raikar |
| 2007/0220598 A1* | 9/2007 | Salowey et al. ................. 726/10 |
| 2007/0277231 A1* | 11/2007 | Medvinsky et al. .............. 726/5 |
| 2008/0005798 A1 | 1/2008 | Ross |
| 2008/0016230 A1* | 1/2008 | Holtmanns et al. ........... 709/229 |
| 2008/0046993 A1 | 2/2008 | Mullick et al. |
| 2008/0235770 A1* | 9/2008 | Miao ................................. 726/4 |
| 2009/0064291 A1* | 3/2009 | Wahl ................................. 726/5 |
| 2009/0100500 A1* | 4/2009 | Wang et al. ...................... 726/2 |
| 2009/0313471 A1* | 12/2009 | Bjorkengren et al. ........ 713/170 |

* cited by examiner

SYSTEM AND METHOD FOR INSTALLING AUTHENTICATION CREDENTIALS ON A NETWORK DEVICE

CROSS-REFERENCE TO RELATED APPLICATIONS

This Application claims the benefit of U.S. Provisional patent application Ser. No. 61/047,985, filed Apr. 25, 2008, which is hereby incorporated by reference in it's entirety.

BACKGROUND

In the past, video conferencing devices have been connected to a private network operating a Video Management System (VMS) by technicians or network (system) administrators employed by the owners of the private network or by local Information Technology (IT) professionals employed by the user of the video conferencing devices. Video conferencing devices may provide authentication credentials to the private network in order to get access to the private network (e.g., the video network). Installers of the credentials may view the authentication credentials in order to install the credentials on the local video conferencing device.

Allowing a local IT professional or user to view the authentication credentials may allow this untrusted entity or person to have unauthorized access to an otherwise secure private network. Since the credentials may not be tied to a specific device, this may allow the credentials to be used or misused by the local IT professional for purposes adverse to the purpose and security of the private network. There are numerous ways authentication credentials which are viewable by a local IT professional or user can be used jeopardize the privacy and security of the private network.

Furthermore, the private network administrators can have difficulty installing the credentials remotely without a local IT professional because the video conferencing devices may not be accessible remotely since the devices are remote and are not currently on the private network.

Some prior solutions for installing credentials include installing Network Access Control (NAC) credentials (authentication credentials) via remote connections, web interfaces, telnet, Secure Shell (SSH), or dataports. These methods use authentication credentials (e.g., 802.1x credentials) that are accessible by local IT professionals.

DETAILED DESCRIPTION

Alterations and further modifications of the inventive features illustrated herein, and additional applications of the principles of the inventions as illustrated herein, which would occur to one skilled in the relevant art and having possession of this disclosure, are to be considered within the scope of the invention. The same reference numerals in different drawings represent the same element.

Local IT professionals working with a video conferencing device should not have direct access to the authentication credentials that enable direct access to a private video network. Network Access Control (NAC) credentials should be installed in a secure manner and the credentials should not be visible from the device anytime before or after the credentials are installed.

The technicians and network administrators working for the owners of the Video Management System (VMS) private network are generally considered to be trusted entities because they are employed to protect the interests of the private network and the company which owns or manages the network. The local IT professionals or users of the video conferencing devices are generally considered to be untrusted entities, because they do not have similar accountability to protect and keep the private network secure.

The present system and method can remotely configure video conferencing devices with authentication credentials in a secure manner. The system and method may use a client application downloaded onto an intermediary computing device or computer by a secure website. The application on the computer may request authentication credentials from a Network Access Control (NAC) credential service and install the received authentication credentials to an endpoint or video conferencing device, without allowing the untrusted entity to view the authentication credentials. The installed authentication credentials on the endpoint may be used to access the Video Management System (VMS) of the private network via a network (e.g., the Internet or a Wide Area Network (WAN)).

Figure 1:
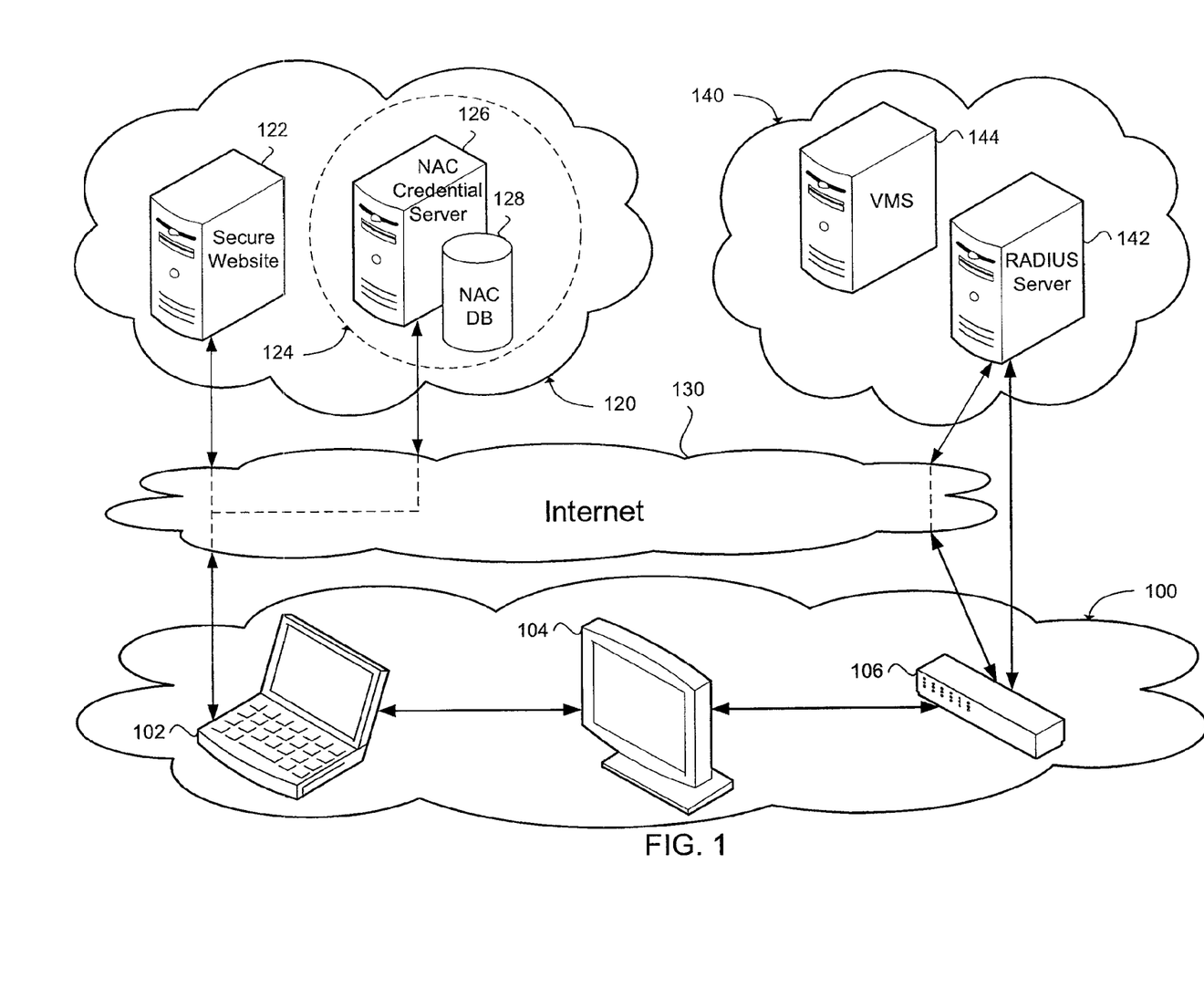
FIG. 1 is an illustration of a network device and an intermediary computing device used for installing authentication credentials in accordance with an embodiment.

FIG. 1 provides an illustration of an embodiment of system components used for installing authentication credentials on a network device (endpoint or video conferencing device) 104 using a client application. The system and method may use an intermediary computing device (client computer or intermediary computer) 102 on a network (e.g., the Internet or a WAN) 130 in communication with the endpoint, a secure website 122, and a Network Access Control (NAC) credential service 124.

The intermediary computing device is enabled to receive or download the application from the secure web server and run the application so the authentication credentials from the NAC credential service can be installed on the endpoint. After the authentication credentials are installed, the endpoint may access the private network services (e.g., video conferencing) by logging into a Video Management System (VMS) 144 using a Remote Authentication Dial-In User Service (RADIUS) server 142 in combination with an authenticating network switch 106.

The Network Access Control (NAC) credential service 124 may use Cisco's Network Admission Control protocols or other similar network admission protocols. The intermediary computing device 102, the endpoint 104, and the authenticating network switch 106 may be components of a user enterprise network 100.

A private network may have a DeMilitarized Zone (DMZ or demarcation zone or perimeter network) 120 with limited access and a standard access network (access for the external user) 140 that allows enhanced access to the private network service. DMZ systems may contain security features and protocols not used in a standard access network to protect the private network and interface with client computers external to or outside the private network. DMZ systems or networks may limit the information stored within the DMZ network to further protect sensitive information from a system breach.

The RADIUS server 142 and the VMS 144 may be components of the standard access network 140. The secure website 122 and the NAC credential service 124 may be components of the DMZ. The NAC credential service may further include a server 126, a database 128, firmware, a processing unit, software, and other components necessary to manage the process of installing authentication credentials on the endpoint (video conferencing device).

Network components may use Ethernet, RG-45, CAT5, wireless connections, or other means utilized to connect devices to a network. Other network devices and couplings may exist in the path between the network components (shown in FIGS. 1 and 2).

In an embodiment, the secure website 122, the NAC credential service 124, the RADIUS server 142, and the VMS 144 may function as separate server systems. In a further embodiment, some of the systems (the secure website, the NAC credential service, the RADIUS server, and the VMS) may be combined and some of the systems may function as separate server systems that may communicate with each other.

The method of using the private network may be initiated by a user purchasing or obtaining a private network service (e.g., video conference service). The purchased private network service may utilize authentication credentials, port-based network access control, or both as a means to access the external user portion or video conferencing service of the private network 140.

The user may initially be given a website address to the secure website 122 and website validation information that can be used to successfully login to the secure website. The website validation information may provide the user permission to download an application from the secure website. The website validation information may be a username, a customer account number, a password, or any other means to uniquely identify a user or customer that can be used to securely log into a website. The website validation information may have a limited use (e.g., single use) or expire after predetermined time, so the website validation information may no longer be used to log into the secure website after the predetermined time.

Figure 2:
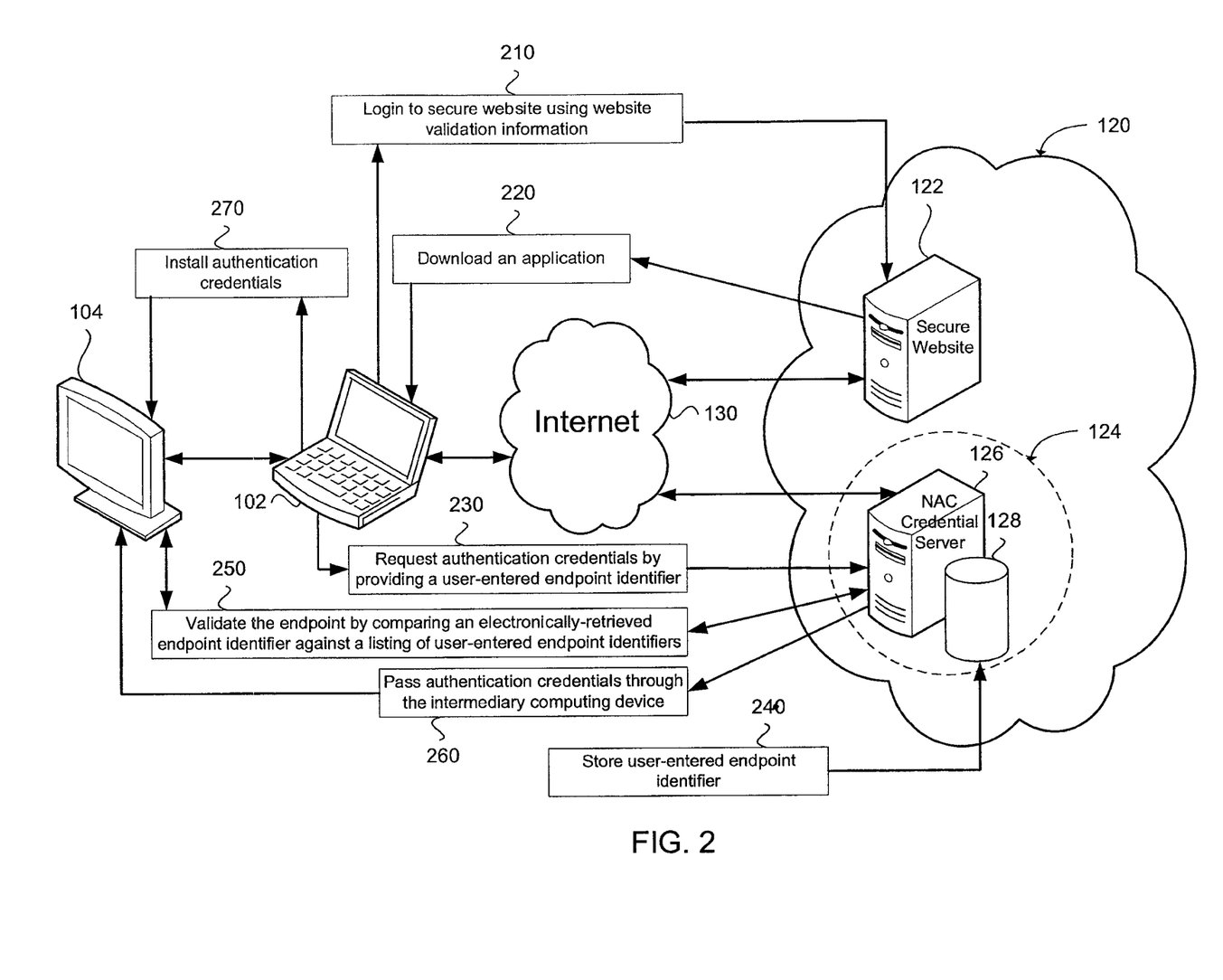
FIG. 2 is an illustration of a method for installing authentication credentials on a network device using an intermediary computing device in accordance with an embodiment.

FIG. 2 illustrates that the user may login 210 to the secure website 122 with the website validation information. After logging into the secure website, the user may download 220 the application from the secure website onto the intermediary computing device 102. Downloading the application from the secure website onto the intermediary computer may include the steps of purchasing the private network service, receiving the website address and website validation information, and logging into the secure website using the website validation information. Logging into the secure website and downloading the application may use encryption protocols to transmit the data or application. The encrypted protocol may use secure shell (SSH), Secure State Processing (SSP), Hypertext Transfer Protocol Secure (HTTPS or HTTP over Secure Socket Layer), or other similar encryption protocols.

The intermediary computing device 102 may be a client computer, a personal computer (PC), or a laptop computer utilized by a user. The client application may be a web application, a software program, or an agent enabled to install or assist in the installation of authentication credentials on an endpoint using the client computer.

In another embodiment, logging 210 into the secure website 122 may include providing a user-entered endpoint identifier to the secure website. The secure website may transfer the user-entered endpoint identifier to the NAC credential service 124 to validate the endpoint 104 when the application requests authentication credentials. For example, the user may indicate the endpoint that is expected to be used with the video conferencing service by providing the MAC address (user-entered endpoint identifier) of the endpoint when the user logs into the secure website. The MAC address provided by the user may later be compared with the MAC address electronically retrieved from the endpoint using the downloaded application. The comparison may be made by the NAC credential service.

The network device 104 may be an endpoint (EP), a video conferencing device, a remote networking device, a hardware appliance, an audio-visual device used for video conferencing, a camera with a monitor, or a supplicant in a port-based network access control system. The VMS 144 (shown in FIG. 1) may allow a user to use any video conferencing device enabled to use the communication protocols supported by the VMS. The video conferencing device may also be enabled to store authentication credentials in an encrypted format.

With the application on the intermediary computer 102, the application may automatically locate the Network Access Control (NAC) credential service 124 and request 230 authentication credentials from the NAC credential service. The NAC credential service may interface with the application on the client computer and manage the process of installing authentication credentials on the endpoint. The request for authentication credentials may include the NAC credential service receiving a user-entered endpoint identifier from the application running on the client computer.

The NAC credential service 124 may store 240 the user-entered endpoint identifier provided by the application on a NAC credential service database 128. The NAC credential service database may store a plurality of user-entered endpoint identifiers. Specifically, the NAC credential service database may store a listing of user-entered end point identifiers received from several applications downloaded to various client computers.

As part of the process of storing the user-entered endpoint identifier, the NAC credential service 124 may also request customer account information or user account information from the secure website 122 or system used to purchase the private network service. The customer account information may be an account number, username, password, and other information associated with a customer.

In addition, the NAC credential service 124 may validate 250 the endpoint 104 attempting to install authentication credentials by comparing the electronically-retrieved endpoint identifier against the user-entered endpoint identifier contained in the listing of user-entered endpoint identifiers. In validating the endpoint, the NAC credential service may obtain an electronically-retrieved endpoint identifier for the endpoint that is delivered by the application. The application may extract or request the electronically-retrieved endpoint identifier from the endpoint or poll the endpoint in order to obtain the endpoint identifier for the NAC credential service.

The user-entered endpoint identifier and the electronically-retrieved endpoint identifier used to validate the endpoint 104 may be device specific information. Device specific information may be related to the endpoint, the intermediary computing device 102 connected to the endpoint, or both the endpoint and intermediary computing device. Device specific information may include a Media Access Control (MAC) address, an Internet Protocol (IP) address, a subnet mask, a gateway address, a H.323 identifier, a serial number, a model number, a device type, hardware configuration, or combination of these identifiers. The requests for device specific information (user-entered endpoint identifier and the electronically-retrieved endpoint identifier) may use encryption methods known in the arts (e.g., secure shell).

The secure website 122 may request the user-entered endpoint identifier from the user before enabling the application to be downloaded to the intermediary computing device 102. In another embodiment, the application may request the user-entered endpoint identifier from the user before validating the end point with the electronically-retrieved endpoint identifier and installing the authentication credentials. The user-entered endpoint identifier can ensure that the authentication credentials are installed on the intended endpoint 104. The user-entered endpoint identifier may also be used to ensure the authentication credentials are installed on a single endpoint device. Using the user-entered endpoint identifier can reduce the misuse of authentication credentials and by restricting the authentication credentials to a single network device.

The electronically-retrieved endpoint identifier may be device specific information embedded in hardware, firmware, or software of the endpoint 104. The electronically-retrieved endpoint identifier may also include embedded device specific information for the intermediary computing device 102 running the application used to install the authentication credentials on the endpoint. Device specific information of the intermediary computing device may be logged and used to track multiple authentication credentials installations using the same the intermediary computing device. The application may be enabled to access, extract, or request the embedded electronically-retrieved endpoint identifier from the endpoint and the intermediary computing device, and deliver the electronically-retrieved endpoint identifier to the NAC credential service 124.

Validating 250 the end point 104 by comparing the electronically-retrieved endpoint identifier against a listing of user-entered endpoint identifiers will now be further explained. When the electronically-retrieved endpoint identifier matches a user-entered endpoint identifier in the listing of user-entered endpoint identifiers, then the NAC credential service may grant permission to install the authentication credential and may proceed to the next step in process. When the electronically-retrieved endpoint identifier does not match a user-entered endpoint identifier in the listing of user-entered endpoint identifiers, then the NAC credential service may terminate the procedure of installing authentication credentials, alert a private network administrator of the failed validation, attempt to re-validate the electronically-retrieved endpoint identifier by querying the endpoint with the application, attempt to re-validate the electronically-retrieved endpoint identifier by allowing the user to submit a new or corrected user-entered endpoint identifier, or a combination thereof. Using the endpoint validation step described may add another layer of protection and security to the installation method, providing enhanced security to the private network.

In another configuration the NAC credential service 124 may obtain the electronically-retrieved endpoint identifier from the endpoint 104 without obtaining a corresponding user-entered endpoint identifier that can be used for comparison. The NAC credential service may link the specific device information of the electronically-retrieved endpoint identifier with the authentication credentials, so the authentication credentials will only be valid on the endpoint device providing the electronically-retrieved endpoint identifier. Additionally, the NAC credential service may transmit the device specific information to the RADIUS server 142 so the RADIUS server can use the device specific information for authentication of the endpoint 104.

Next, the application may pass 260 authentication credentials from the NAC credential service 124 through the intermediary computing device 102 to the endpoint 104. After the authentication credentials are passed through the intermediary computing device to the endpoint, the application may install 270 the authentication credentials on the endpoint.

The NAC credential service may also transmit the valid authentication credentials to the Remote Authentication Dial-In User Service (RADIUS) server 142 (FIG. 1) or the Video Management System (VMS) 144 (FIG. 1) to be stored on the RADIUS server or the VMS, respectively. The authentication credentials may be used by the endpoint to access the private network or VMS using the RADIUS server. In another embodiment, user account information for the endpoint device and valid authentication credentials to be installed on that endpoint may be created on the RADIUS server and replicated to the NAC credential service or the VMS. The authentication credentials may be created by a network administrator (a person) or the credentials may be automatically generated by the NAC credential service, RADIUS server, the VMS, or other component of the private network. The authentication credentials may be randomly generated.

In an embodiment, the application may pass the authentication credentials through the intermediary computing device 102 and install the authentication credentials onto the endpoint 104 using encrypted data. Using encrypted data to transmit and store the authentication credentials enhances security by not allowing the application on the client to handle non-encrypted authentication credentials in the installation process. The encrypted data can prevent a user from viewing the authentication credentials in the transmission and installation process. The encryption may utilize device specific information so the authentication credentials cannot be used on another endpoint. The encrypted data may use secure shell (SSH), Secure State Processing (SSP), Hypertext Transfer Protocol Secure (HTTPS or HTTP over Secure Socket Layer), or other encryption protocols.

The authentication credentials may be stored in an area or storage location of the endpoint 104 that is hidden or inaccessible to a user or local IT professional. The authentication credentials may be a user name, password, or any other information used in authentication. The authentication credentials may use an Institute of Electrical & Electronics Engineers (IEEE) 802.1x standard or protocol.

A VMS IP address may also be installed when the credentials are installed. The VMS IP address may be used by the VMS 144 to manage the endpoint after authentication by the RADIUS server 142.

Using the NAC credential service 124, the application may verify or validate the installation of authentication credentials on the endpoint 104, after the authentication credentials have been installed to ensure the installation was complete. If the authentication credentials were not properly installed, the NAC credential service may re-install the credentials, alert an administrator of the private network of the failed installation, terminate the procedure for installing authentication credentials, or perform a combination thereof.

After the authentication credentials have been installed on the endpoint 104, the endpoint may be connected to a port of an authenticating network switch 106 with the authentication protocols of the port enabled. In another embodiment, the endpoint may be connected to the port of the authenticating network switch, but access to a private network service (e.g., VMS 144) using a RADIUS server 142 may only occur after the authentication credentials are installed.

Installed authentication credentials on an endpoint allow users to use a third party's private network video management system, which is explained below.

In order to use the endpoint 104 to video conference with another video conferencing device over a network, a Video Management System (VMS) 144 (shown in FIG. 1) may be used to manage the connection and interchange of information and data between the devices. Video management systems may be administered by a third party's private network 120 & 140, which may be separate and distinct (separated by a firewall) from the private networks of the users of the video conferencing devices. The user's private network and the VMS's private network may be connected together by a larger network 130, such as the Internet or a WAN, as shown in FIG. 1.

In order to maintain the security and privacy of the video conference and the VMS 144, the private network 140 of the VMS may use port-based network access control as a means to access the private network. Port-based network access control can use a Remote Authentication Dial-In User Service (RADIUS) server 142 in conjunction with an authenticating network switch 106 to authenticate the identity of the endpoint 104 for use by the private network or the VMS of the private network. The authenticating network switch may have ports to provide the endpoint with a connection to a Local Area Network (LAN), the network 130, a WAN, or the Internet. The ports of the authenticating network switch may be enabled to use authentication protocols so the endpoint may only access the VMS or the private network via the RADIUS server with valid authentication credentials stored on the video conferencing device. A video conferencing device initially may not have valid authentication credentials installed on the device. Valid credentials may be a user name and password. The user name and password may not be assigned to a particular endpoint. The present system and method may assist a user and the private network administrator in securely installing these authentication credentials installed on the endpoint, so a user cannot view the credentials before, during, or after installation.

Using a port-based network access control can provide secure and encrypted communication to the VMS 144 using the protocols of the authenticating network switch 106. The port may be enabled to set authentication protocols so communication with the VMS or the private network 120 & 140 can occur after the remote device successfully logs into the RADIUS server 142. Until the endpoint 104 has been authenticated by the RADIUS server, the authentication protocols of the enabled port may only respond to communication from the endpoint allowing for the submission of authentication credentials. For example, the system and method may use a Procurve Switch as the authenticating switch. The authentication protocols may use an IEEE 802.1x standard, and the authenticating network switch may be enabled to use 802.1x authentication protocols. A port's authentication protocols may be normally enabled on the switch, so only data conforming to 802.1x authentication protocols may be transmitted to a private network. Other port-based network access control standards and protocols may also be used.

Three distinct roles existing within a port-based network access control interaction are: Authenticator, supplicant, and authentication server. The authenticator is the port device that wishes to enforce authentication before allowing access to services that are accessible via that port. The supplicant is the device or system wishing to access the services via that port. The authentication server performs the authentication function necessary to check the credentials of the supplicant on behalf of the authenticator and authorizes the supplicant to use the authenticator's services via the authenticator's port. The ports on the authenticating network switch 106 may adopt the role of the authenticator. The endpoint (video conferencing device) 104 may adopt the role of the supplicant. The RADIUS server 142 may adopt the role of the authentication server in the port-based network access control interaction.

The RADIUS server 142 may block all communication to the private network 140, except communication involving authentication of authentication credentials of the endpoint 104 via the port. After the endpoint provides proper authentication credential to the RADIUS server, the endpoint may be able to access the other parts of the private network, such as the VMS. Utilizing the VMS allows the endpoint to connect with any other video conferencing devices coupled to the VMS via the network 130, WAN, or Internet.

The method may also include the application or a user rebooting the endpoint 104. Rebooting the endpoint may cause the endpoint to recognize and use the authentication protocols when the endpoint is connected to the port of the authenticating network switch 106. In addition, the method may include disconnecting the intermediary computing device 102 from the endpoint after installing the authentication credentials.

In another embodiment, the NAC credential service or application may automatically abort the installation of the authentication credentials when a pre-determined maximum time for installing the authentication credentials has been exceeded. The pre-determined maximum time may be from the time the application requests authentication credentials to the time the authentication credentials are installed. In another configuration, the application may only run for a specified time from the time the application is downloaded to the intermediary computing device.

After the authentication credentials have been installed on the remote network device the device may be enabled to access the private network and the VMS using port-based network access control (the RADIUS server and authenticating network switch), such as 802.1x authentication. Once a device has authentication credentials the device may be moved to any port of any authenticating network switch and still be able to access the private network.

After the authentication credentials have been installed on the remote network device, the remote network device has permanent or enduring credentials and may be managed by the VMS. The present system and method allows the network device without valid authentication credentials to obtain valid credentials, so that the user or local IT professional is unable to view the authentication credentials.

Some of the results of the system and method described are that the method can be automated to install NAC credentials (authentication credentials) on video conferencing devices in a secure manner. The method does not require on-site IT professionals to have knowledge of the authentication credentials needed to obtain access to a private network. In addition, security risks to the private network can be minimized by not having the authentication credentials known by unauthorized or untrusted personnel (a user or local IT professional), by validating the device specific information of the endpoint, and by validating the completion of the installation process.

The method and system for installing authentication credentials on an endpoint may be implemented using a computer readable medium having executable code embodied on the medium. The computer readable program code may be configured to provide the functions described in the method. The computer readable medium may be a RAM, ROM, EPROM, floppy disc, flash drive, optical drive, magnetic hard drive, or other medium for storing electronic data.

Figure 3:
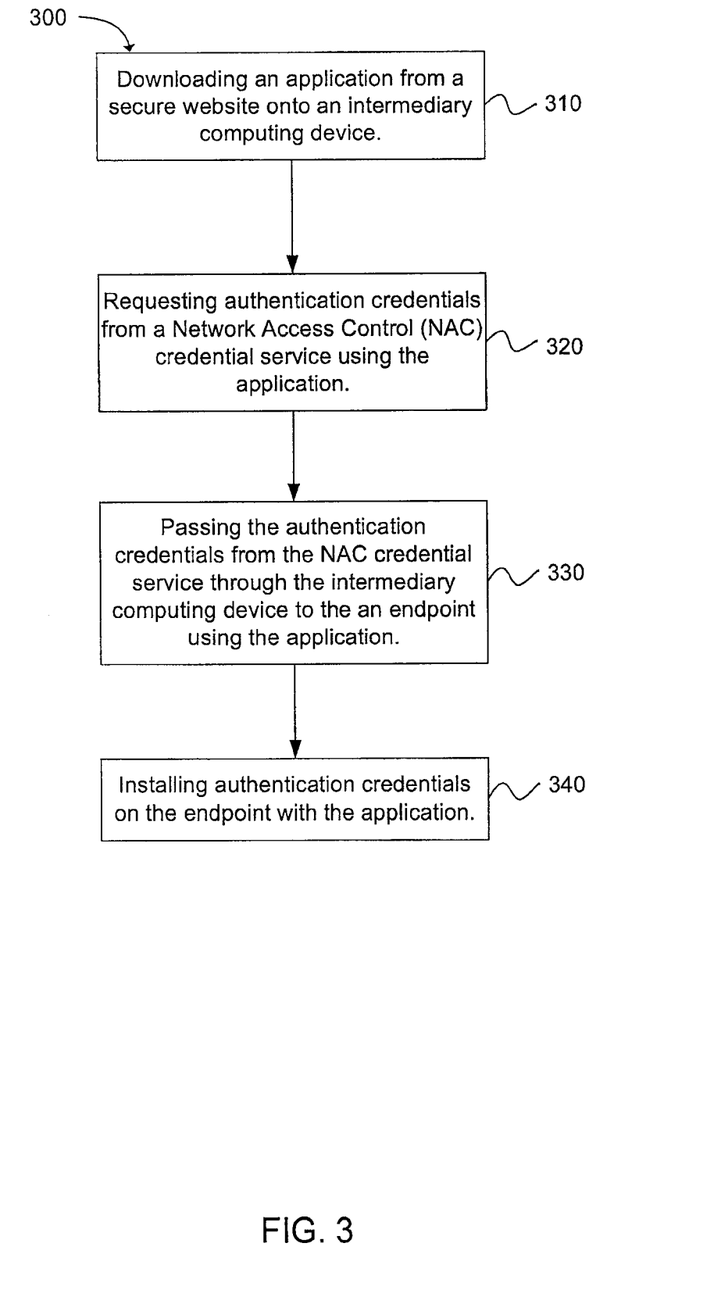
FIG. 3 is a flow chart illustrating a method for installing authentication credentials on a network device using a client application in accordance with an embodiment.

Another embodiment provides a method 300 for installing authentication credentials on a network device using a client application, as shown in the flow chart in FIG. 3. The method includes the operation of downloading 310 the application from a secure website onto an intermediary computing device. The operation of requesting 320 authentication credentials from a Network Access Control (NAC) credential service using the application can be performed.

The method 300 further includes passing 330 the authentication credentials from the NAC credential service through the intermediary computing device to an endpoint using the application. The intermediary computing device may be coupled between the NAC credential service and the endpoint. After passing through the authentication credentials to the endpoint, the operation of installing 340 the authentication credentials on the endpoint with the application follows.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for installing authentication credentials on a network device, comprising:
   downloading an application from a secure website onto an intermediary computing device;
   requesting authentication credentials from a Network Access Control (NAC) credential service using the application;
   passing the authentication credentials from the NAC credential service through the intermediary computing device to an endpoint using the application; and
   installing the authentication credentials on the endpoint using the application.

2. The method of claim 1, wherein passing the authentication credentials to the endpoint uses encrypted data to transmit the authentication credentials from the NAC credential service to the endpoint, and wherein installing the authentication credentials uses encrypted data to store the authentication credentials on the endpoint.

3. The method of claim 1, wherein the endpoint is a video conferencing device and the intermediary computing device is a client computer.

4. The method of claim 1, wherein downloading the application further comprises:
   purchasing a private network service, wherein a user purchases the service;
   receiving a website address and website validation information by the user;
   logging into the secure website using the website validation information; and
   downloading the application from the secure website.

5. The method of claim 4, wherein logging into the secure website using the website validation information further comprises:
   providing a user-entered endpoint identifier to the secure website; and
   transferring the user-entered endpoint identifier from the secure website to the NAC credential service using the secure website.

6. The method of claim 4, wherein the website validation information is a username and a password.

7. The method of claim 4, wherein the website validation information expires after a predetermined time, so the website validation information can no longer be used to log into the secure website after the predetermined time.

8. The method of claim 1, wherein requesting authentication credentials further comprises:
   receiving a user-entered endpoint identifier by the NAC credential service communicating with the application;
   obtaining an electronically-retrieved endpoint identifier from the endpoint delivered by the application to the NAC credential service; and
   validating the endpoint with the user-entered endpoint identifier stored with the NAC credential service by comparing the electronically-retrieved endpoint identifier against a the user-entered endpoint identifier.

9. The method of claim 8, wherein the user-entered endpoint identifier and the electronically-retrieved endpoint identifier are selected from the group consisting of a Media Access Control (MAC) address, an Internet Protocol (IP) address, a subnet mask, a gateway address, a serial number, a model number, a device type, and combination thereof.

10. The method of claim 1, wherein requesting authentication credentials further comprises:
    creating the authentication credentials by the NAC credential service; and
    storing a user-entered endpoint identifier provided by the application on a NAC credential service database.

11. The method of claim 1, wherein installing the authentication credentials on the endpoint further comprises verifying the installation of the authentication credentials on the endpoint using the application and the NAC credential service.

12. The method of claim 1, further comprising disconnecting the intermediary computing device from the endpoint and rebooting the endpoint after installing the authentication credentials on the endpoint, wherein the endpoint is enabled to provide authentication credentials to a Remote Authentication Dial-In User Service (RADIUS) server using a port of an authenticating network switch.

13. The method of claim 1, further comprising connecting the endpoint to a port of an authenticating network switch, wherein authentication protocols of the port are enabled.

14. The method of claim 13, wherein the authentication protocols use an 802.1x authentication standard and the authenticating network switch is enabled to use 802.1x authentication.

15. The method of claim 13, further comprising accessing a private network service using a Remote Authentication Dial-In User Service (RADIUS) server and the authenticating network switch.

16. A system for installing authentication credentials on a network device, comprising:
    an intermediary computing device;
    an endpoint coupled to the intermediary computing device;
    a secure website coupled to the intermediary computing device using a network, wherein the secure website is enabled to verify website validation information before downloading an application onto the intermediary computing device from the secure website; and
    a Network Access Control (NAC) credential service coupled to the intermediary computing device using the network, wherein the NAC credential service is enabled to provide authentication credentials to the application for installation on the endpoint; and
    wherein the application is enabled to request authentication credentials from NAC credential service, pass authentication credentials from NAC credential service through the intermediary computing device to the endpoint, and install the authentication credentials on the endpoint.

17. The system of claim 16, further comprising:
a NAC credential service database used to store a user-entered endpoint identifier, wherein an electronically-retrieved endpoint identifier obtained from the endpoint is validated against the user-entered endpoint identifier before installing the authentication credentials;
an authenticating network switch with a port, wherein the port is in communication with the endpoint and the authentication protocols of the port are enabled; and
a Remote Authentication Dial-In User Service (RADIUS) server in communication with the authenticating network switch using the network, wherein the RADIUS server is enabled to authenticate the endpoint using authentication credentials installed on the endpoint.

18. The system of claim 16, wherein the Network Access Control (NAC) credential service further comprises:
receiving a user-entered endpoint identifier from the application;
storing the user-entered endpoint identifier provided by the application on a NAC credential service database; and
validating the endpoint by comparing an electronically-retrieved endpoint identifier against the user-entered endpoint identifier, wherein the application obtains the electronically-retrieved endpoint identifier from the endpoint and delivers the electronically-retrieved endpoint identifier to the NAC credential service.

19. A method for installing authentication credentials on a network device, comprising:
validating website validation information via a secure website to provide permission to the secure website for downloading an application;
downloading the application from the secure website onto an intermediary computing device;
requesting authentication credentials by providing a user-entered endpoint identifier to a Network Access Control (NAC) credential service using the application;
validating an endpoint with the NAC credential service by comparing an electronically-retrieved endpoint identifier against the user-entered endpoint identifier, wherein the application obtains the electronically-retrieved endpoint identifier from the endpoint and delivers the electronically-retrieved endpoint identifier to the NAC credential service;
passing the authentication credentials from the NAC credential service through the intermediary computing device to the endpoint using the application;
installing the authentication credentials on the endpoint using the application;
connecting the endpoint to a port of an authenticating network switch, wherein authentication protocols of the port are enabled; and
accessing a private network service via a Remote Authentication Dial-In User Service (RADIUS) server and the authenticating network switch.

20. A system for video conferencing, comprising:
a video conferencing device to communicate with at least one other remote video conferencing device connected to a video management system (VMS) on a private network;
an intermediary computing device connected to the video conferencing device, wherein the intermediary computing device is to download an authentication application from a secure web server, run the authentication application to obtain authentication credentials from a network access control (NAC) credential server, and pass the authentication credentials to the video conferencing device; and
an authenticating network switch to connect the video conferencing device to the VMS on the private network, and allow the video conferencing device to be authenticated by the VMS through use of the authentication credentials,
wherein authentication of the video conferencing device enables the video conferencing device to communicate with the at least one other remote video conferencing device connected to the VMS on the private network.

* * * * *